US005882767A

United States Patent [19]

Simmons, Jr.

[11] Patent Number: 5,882,767

[45] Date of Patent: *Mar. 16, 1999

[54] FAN-FOLDED STOCK MATERIAL FOR USE WITH A CUSHIONING CONVERSION MACHINE

[75] Inventor: James A. Simmons, Jr., Painesville, Ohio

[73] Assignee: Ranpak Corp., Concord Township, Ohio

[ * ] Notice: The terminal 9 months of this patent has been disclaimed.

[21] Appl. No.: 365,829

[22] Filed: Dec. 29, 1994

Related U.S. Application Data

[62] Division of Ser. No. 994,940, Dec. 22, 1992, Pat. No. 5,387,173.

[51] Int. Cl.$^{6}$ .................. B32B 3/28

[52] U.S. Cl. .................. 428/126; 428/181; 493/967; 206/584; 206/814; 206/449

[58] Field of Search .................. 428/126, 174, 428/179, 181, 154; 462/26; 281/5; 206/494, 584, 449, 814; 493/967

[56] References Cited

U.S. PATENT DOCUMENTS

| | | | |
|---|---|---|---|
| 1,385,569 | 7/1921 | Mayer et al. | 462/26 |
| 2,884,262 | 4/1959 | Stratton | 462/26 |
| 3,509,798 | 5/1970 | Johnson . | |
| 3,578,155 | 5/1971 | Small et al. . | |
| 3,603,216 | 9/1971 | Johnson . | |
| 3,655,500 | 4/1972 | Johnson . | |
| 3,743,528 | 7/1973 | Calleson . | |
| 3,779,039 | 12/1973 | Schultenkamper . | |
| 4,026,198 | 5/1977 | Ottaviano . | |
| 4,109,040 | 8/1978 | Ottaviano . | |
| 4,247,289 | 1/1981 | McCabe | 493/967 |
| 4,376,589 | 3/1983 | Avellant et al. | 400/606 |
| 4,620,726 | 11/1986 | Donnelly | 282/1 R |
| 4,717,613 | 1/1988 | Ottaviano . | |
| 4,725,469 | 2/1988 | Summerfield | 428/126 |
| 4,750,896 | 6/1988 | Komaransky et al. . | |
| 4,824,426 | 4/1989 | DeFresne . | |
| 4,884,999 | 12/1989 | Balducci . | |
| 4,950,218 | 8/1990 | Tsuru . | |
| 5,054,758 | 10/1991 | Windsor . | |
| 5,088,972 | 2/1992 | Parker . | |
| 5,123,889 | 6/1992 | Armington et al. . | |

FOREIGN PATENT DOCUMENTS

| | | |
|---|---|---|
| 0286538 | 10/1988 | European Pat. Off. . |
| WO9013414 | 12/1993 | WIPO . |

OTHER PUBLICATIONS

U.S. application No. 07/592,572, Filed Oct. 5, 1990, "Cushioning Conversion Machine".

*Primary Examiner*—Alexander Thomas
*Attorney, Agent, or Firm*—Renner, Otto, Boisselle & Sklar, P.L.L.

[57] ABSTRACT

A stock material for use with a cushioning conversion machine is provided. The stock material includes a plurality of superimposed plies of a sheet-like material which are fan-folded into a rectangonal stack. The superimposed plies include a series of alternating folds which each create superimposed creases through the plies. The alternating folds together form a sequence of rectangular pages which are piled accordion-style one on top of the other to form the rectangonal stack.

17 Claims, 2 Drawing Sheets

FAN-FOLDED STOCK MATERIAL FOR USE WITH A CUSHIONING CONVERSION MACHINE

This is a divisional of application Ser. No. 07/994,940 filed on Dec. 22, 1992, now U.S. Pat. No. 5,387,173.

FIELD OF THE INVENTION

This invention relates generally as indicated to fan-folded stock material for use with a cushioning conversion machine.

BACKGROUND AND SUMMARY OF THE INVENTION

In the process of shipping an item from one location to another, a protective packaging material is typically placed in the shipping case, or box, to fill any voids and/or to cushion the item during the shipping process. Plastic foam peanuts and plastic bubble pack are two types of conventionally used packaging materials and these plastic materials, while performing acceptably in many packaging applications, are not without disadvantages. For example, one drawback of plastic bubble film is that it usually includes a polyvinylidene chloride coating which prevents the plastic film from being safely incinerated thereby creating disposal difficulties for some industries. Additionally, both the plastic foam peanuts and the plastic bubble pack have a tendency to generate a charge of static electricity which attracts dust from the surrounding packaging site. Furthermore, these plastic materials sometimes themselves produce a significant amount of packaging "lint." Such dust and lint particles are generally undesirable and may even be destructive to sensitive merchandise such as electronic or medical equipment.

However, perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

These and other disadvantages of conventional plastic packaging materials have made paper protective packaging material a very popular alternative. Paper is biodegradable, recyclable and renewable thereby making it an environmentally responsible choice for conscientious industries. Additionally, paper may be safely incinerated by the recipients of the products. Furthermore, paper protective packaging material is perfect for particle-sensitive merchandise, as its clean dust-free surface is resistant to static cling.

While paper in a sheet-like form could possibly be used as a protective packaging material, it is usually preferable to convert sheet-like stock material into a relatively low density pad-like cushioning product. This conversion may be accomplished by a cushioning conversion machine, such as those disclosed in U.S. Pat. Nos. 3,509,798; 3,603,216; 3,655,500; 3,779,039; 4,026,198; 4,109,040; 4,717,613; and 4,750,896, and co-pending U.S. patent application Ser. Nos. 07/592,572 and 07/712,203. The entire disclosures of these patents and applications, which are owned by the assignee of the present application, are hereby incorporated by reference.

In a typical cushioning conversion machine, the stock material constituting the starting material for the conversion process will usually be composed of a one or more plies of a sheet-like material rolled onto a hollow cylindrical tube. Consequently, the stock supply assembly of the cushioning conversion machine is adapted to accommodate this rolled stock material. For example, the stock supply assembly often includes two laterally spaced brackets which are each generally shaped like a sideways "U" and have two legs extending perpendicularly outward from a flat connecting base wall. One set of corresponding legs have open slots in their distal ends to cradle a supply rod. During operation of the machine, the supply rod extends relatively loosely through the hollow tube of the rolled stock material. In this manner, the tube will freely rotate thereby dispensing the stock material as the stock material is pulled through the machine.

The present invention provides an alternative to the rolled stock material conventionally used in cushioning conversion machines. Particularly, the present invention provides fan-folded stock material for use in a cushioning conversion machine. With this stock material, the need for a hollow cylindrical tube (which usually forms the core of rolled stock material) is eliminated. The fan-folded stock material is compatible with existing cushioning conversion machines which are designed for use with rolled stock material, such as those machines disclosed in U.S. Pat. Nos. 3,509,798; 3,603,216; 3,655,500; 3,779,039; 4,026,198; 4,109,040; 4,717,613; and 4,750,896; co-pending U.S. patent application Ser. Nos. 7/592,572 and 07/712,203; and/or other cushioning conversion machines currently being developed and patented by the assignee of the present invention. Additionally, the fan-folded stock material may be stored and/or transported in a box. Still further, increased operating speeds are possible, and edge-tension problems are minimized, when the fan-folded stock material is used instead of rolled stock material.

More particularly, the present invention provides a biodegradable and recyclable stock material for use with a cushioning conversion machine which comprises a plurality of superimposed plies of a sheet-like material. The superimposed plies are fan-folded into a rectangonal stack and include a series of alternating folds which each create superimposed creases through the plies. The series of folds together form a sequence of rectangular pages which are piled accordion-style one on top of the other to form the rectangonal stack. The plies preferably are each made of paper and, more preferably, are each made of thirty-pound Kraft paper. However, one or more of the plies may be made of another type of sheet-like material and/or paper, such as printed paper, bleached paper, fifty-pound Kraft paper, or combinations thereof.

In many of the above-noted conversion machines, the compatible fan-folded stock material would comprise three plies. However, other multi-ply arrangements, such as two-ply, four-ply, and eight-ply arrangements, are possible with, and contemplated by, the present invention. Additionally, in many of the above-noted conversion machines the compatible stock material would be fan-folded in such a manner that each of the rectangular pages has a width of approximately thirty inches and the distance between the folds is approximately twelve inches. (Thus, the width of the stack would be approximately thirty inches and the length of the stack would be approximately twelve inches.) Nonetheless, the dimensions of the rectangular pages (and thus the rectangular stack) will vary depending upon the characteristics of the cushioning conversion machine being used and/or the desired qualities of the cushioning product being created. In any event, the stock material is preferably transported, stored, and dispensed from a package such as a corrugated cardboard box.

The present invention also provides a method of converting a sheet-like stock material into a cushioning product. The method includes the steps of providing a stock material; fan-folding the stock material into a rectangonal stack; providing a conversion assembly for converting the stock material into the cushioning product; supplying the sheet-like stock material from the rectangonal stack to the conversion assembly; and converting the sheet-like stock material into the cushioning product. The conversion of the sheet-like stock material preferably includes inwardly rolling the lateral sides of the sheet-like material to form a continuous strip having two lateral pillow-like portions and a central band therebetween; coining the central band of the continuous strip to form a coined strip; and cutting the coined strip into sections of a desired length to create the cushioning product.

These and other features of the invention are fully described and particularly pointed out in the claims. The following descriptive annexed drawings set forth in detail one illustrative embodiment. However this embodiment is indicative of but one of the various ways in which the principles of the invention may be employed.

DETAILED DESCRIPTION

Figure 1:
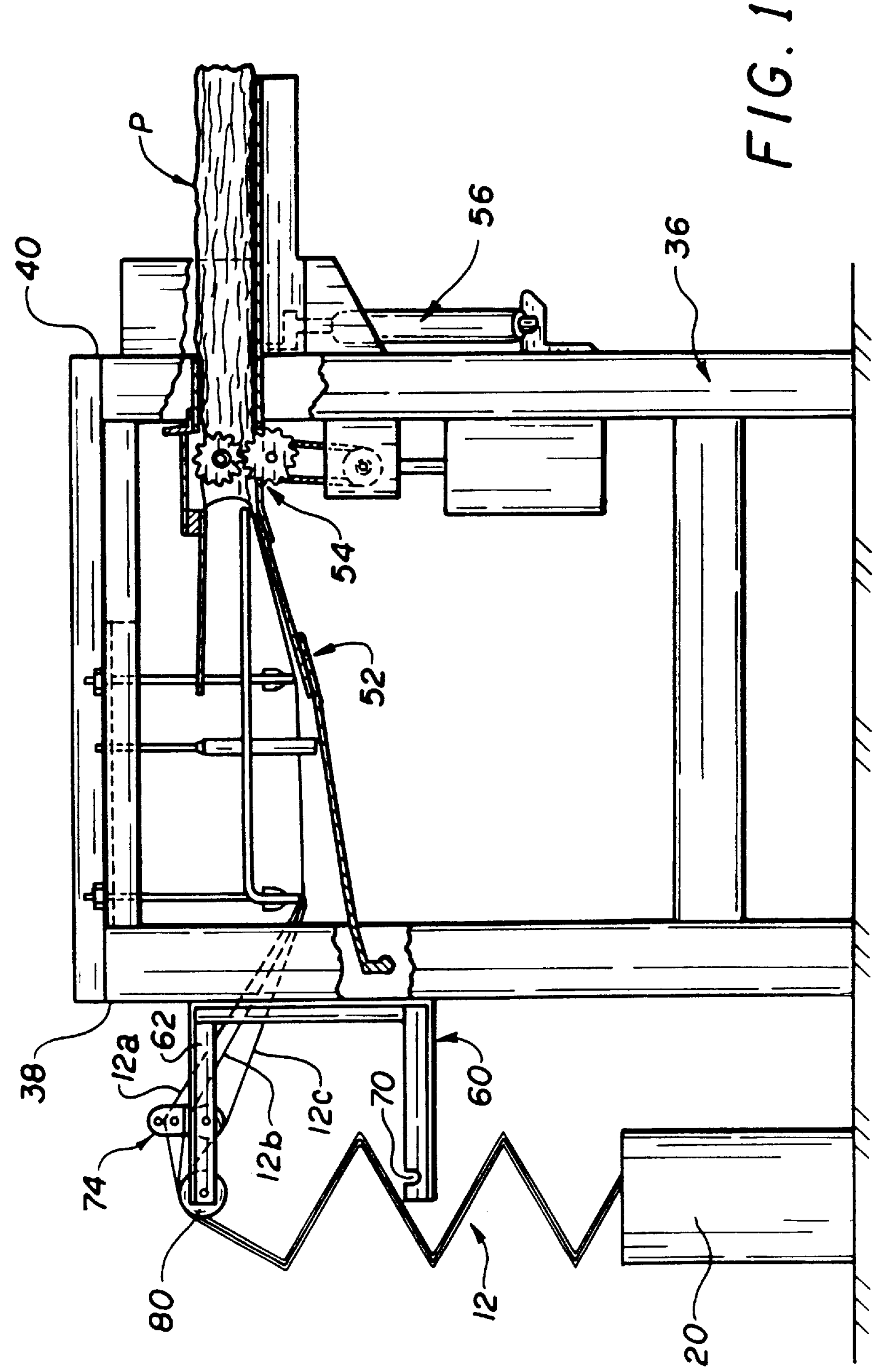
FIG. 1 is a side view of a cushioning conversion machine loaded with a stock material which is fan-folded according to the present invention.

Referring now to the drawings, and initially to FIG. 1, a cushioning conversion machine 10 is shown. As is explained in more detail below, the machine 10 includes conversion assemblies (hereinafter collectively referred to as "the conversion assembly 11") for converting a stock material 12 into a cushioning product P. According to the present invention, the stock material 12 is "fan-folded" thereby providing an alternative to the rolled stock material currently being used with many cushioning conversion machines.

Figure 2:
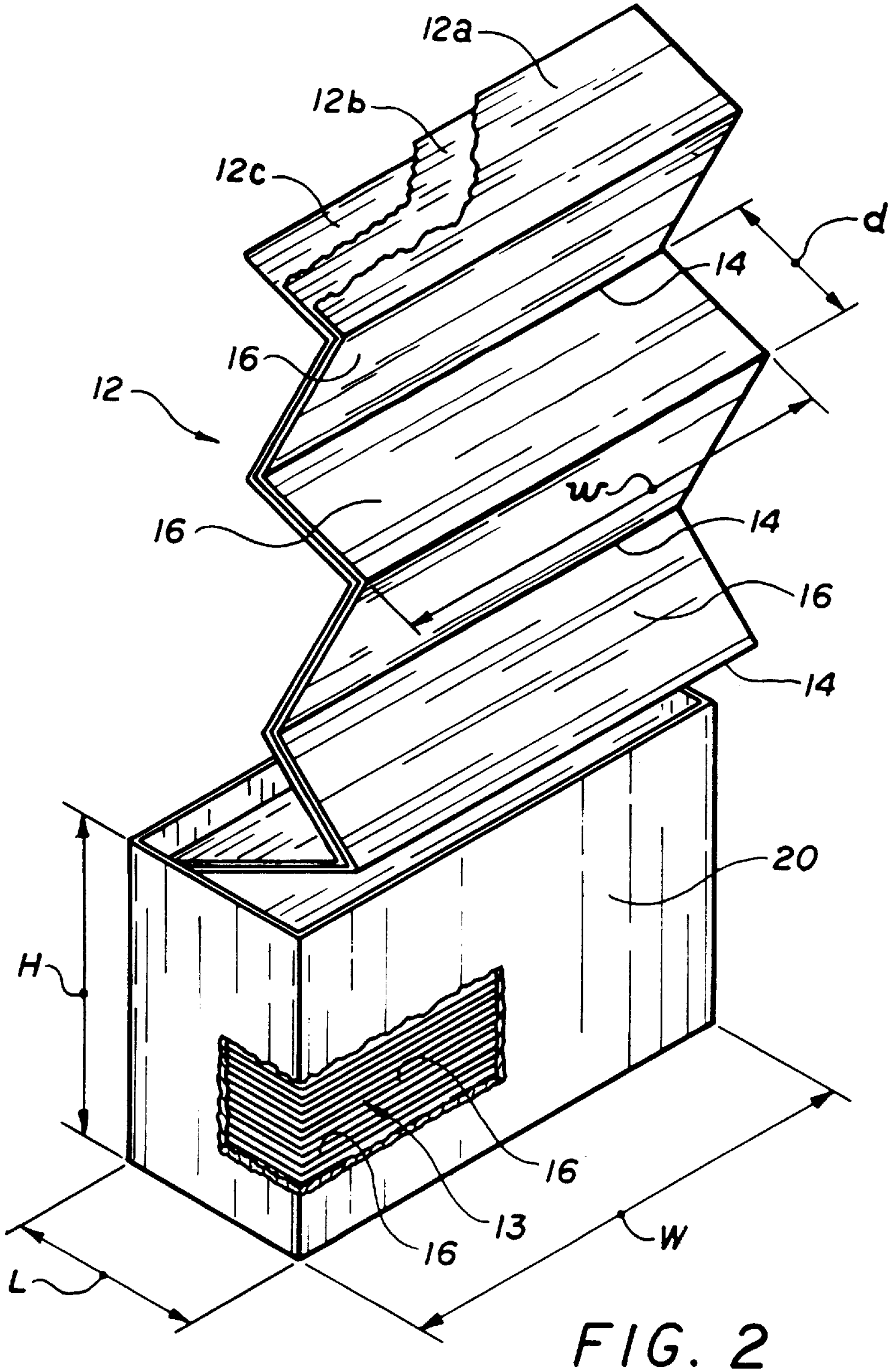
FIG. 2 is a perspective view of the fan-folded stock material.

Referring now to FIG. 2, the fan-folded stock material 12 is shown. The stock material 12 is biodegradable and recyclable thereby making it an environmentally responsible choice for conscientious industries. The stock material 12 comprises a plurality of superimposed plies 12*a*, 12*b*, and 12*c* of sheet-like material. The plies 12*a*, 12*b*, and 12*c* are preferably each made of paper and, more preferably, are each made of thirty-pound Kraft paper. However, one or more of the plies may be made of another type of sheet-like material and/or paper, such as printed paper, bleached paper, fifty-pound kraft paper, or combinations thereof. Additionally, although in the illustrated embodiment the fan-folded stock material 12 comprises three plies of the selected sheet-like material, other multi-ply arrangements, such as two-ply, four-ply, and eight ply arrangements, are possible with, and contemplated by, the present invention. The number of plies of the sheet-like material may vary depending upon the characteristics of the cushioning conversion machine being used and/or the desired qualities of the cushioning product being created. In fact, in certain situations, single-ply fan-folded stock material may be the most compatible choice for a particular cushioning conversion machine and/or a specific cushioning requirement.

According to the present invention, the plies 12*a*, 12*b*, and 12*c* of the sheet-like material are "fan-folded" into a rectangonal stack 13 thereby eliminating the need for a hollow cylindrical tube (which usually forms the core of rolled stock material). In the fan-folded stock material 12, the superimposed plies 12*a*, 12*b*, and 12*c* include a series of alternating folds 14 which each create superimposed creases through the plies 12*a*, 12*b*, and 12*c*. The series of folds 14 together form a sequence of rectangular pages 16 which are piled accordion-style one on top of the other to form the stack 13. The folds are free of perforations and the rectangular pages 16 have lateral edges that are unconnected to each other. The rectangular pages 16 are free of perforations. The fan-folding of the plies 12*a*, 12*b*, and 12*c* may be accomplished by a "folder" mechanism manufactured and sold by B. Bunch Co. Inc., of Phoenix Ariz. Such a mechanism is commonly used to fan-fold items such as forms, labels, and tickets.

In the illustrated embodiment, the folds 14 are arranged so that each of the rectangular pages 16 has a width w of thirty inches and the distance d between folds 14 is approximately twelve inches. In this manner, the width W of the rectangonal stack 13 is approximately thirty inches and the length L of the rectangonal stack 13 is approximately twelve inches. However, as with the ply selection, the dimensions of the rectangular pages 16 (and thus the rectangular stack 13) are dependent primarily upon the characteristics of the cushioning conversion machine being used and/or the desired qualities of the cushioning product being created. For example, in a cushioning conversion machine in which the preferred width of the stock material is fifteen inches, the width w of the rectangular pages 16 and the width W of the rectangonal stack 13 would be approximately fifteen inches.

The height H of the rectangonal stack 13 depends upon the total longitudinal span of the plies 12*a*, 12*b*, and 12*c*. Accordingly, the height H could vary significantly depending on customer demands. However, applicant currently contemplates that typical spans would be one-thousand feet, four hundred-fifty feet, and thirteen hundred-fifty feet, as these spans equal those of the rolled stock material presently being used with many cushioning conversion machines.

A package may be provided for the fan-folded stock material for ease in storage and/or transportation. In the illustrated and preferred embodiment, the package comprises a corrugated cardboard box 20 in which the rectangonal stack 13 is sealed. The size and/or shape of the box 20 will, of course, depend partially on the geometry of the rectangonal stack 13. By way of example, for a rectangonal stack having a width W of approximately thirty inches and a length L of approximately twelve inches, the box 20 would be approximately thirteen inches wide and thirty-one inches long. Additionally, for a typical total longitudinal span of the plies 12*a*, 12*b*, and 12*c*, the box 20 would be approximately ten inches high.

The ability to store the stock material 12 in the box 20 may be desirable in certain situations. For example, consumer information may be printed on each box, such as a company logo, threading and care instructions and/or product identification. Additionally, the box 20 may be palletized for storage and/or transportation requirements and the box 20 may be dimensioned so that it is U.P.S. shippable. Still further, the use of stretch wrap (sometimes employed to protect rolled stock material) will usually not be required.

Referring now back to FIG. 1, the conversion assembly 11 of the machine 10 is mounted on a frame assembly 36. The frame assembly 36 forms the structural skeleton of the machine 10 and may be viewed as defining an upstream or "feed" end 38 and a downstream or "discharge" end 40. The terms "upstream" and "downstream" in this context are characteristic of the direction of flow of the stock material 12 through the machine 10.

The conversion assembly 11 of the machine 10 preferably includes a forming assembly 52, a pulling/connecting assembly 54, and a cutting assembly 56. These conversion assemblies are essentially identical to those disclosed in U.S. Pat. No. 4,750,896 which is assigned to the assignee of the present invention. (The details set forth in this patent regarding these conversion assemblies are hereby particularly incorporated by reference. The entire disclosure of this application has already been incorporated by reference). Nonetheless, other forms of conversion assemblies are possible with, and contemplated by, the present invention. Consequently, the term "conversion assembly" is hereby defined as any assembly or any collection of assemblies, regardless of whether it is structurally equivalent to the disclosed conversion assembly 11, which converts a sheet-like stock material into a cushioning product.

During the conversion process, the forming assembly 52 causes inward rolling of the lateral sides of the sheet-like stock material 12 to form a continuous strip having two lateral pillow-like portions and a central band therebetween. The pulling/connecting assembly 54 performs a "pulling" function by drawing the continuous strip through the nip of the two cooperating and opposed gears thereby pulling stock material through the forming assembly 52. The pulling/connecting assembly 54 additionally performs a "connecting" function when the two opposing gears coin the central band of the continuous strip as it passes therethrough to form a coined strip. As the coined strip travels downstream from the pulling/connecting assembly 54, the cutting assembly 56 cuts the strip into sections of a desired length to create the product P.

The stock material 12 is supplied to the conversion assembly 11 of the machine 10 by a stock supply assembly 60. "Stock supply assembly" in this context corresponds to any assembly, regardless of whether it is structurally equivalent to the disclosed stock supply assembly, which supplies the sheet-like stock material to the conversion assembly 11. In the illustrated and preferred embodiment, the stock supply assembly 60 is essentially identical to the analogous component disclosed in U.S. Pat. No. 4,750,896. Thus, the stock supply assembly 60 includes two laterally spaced brackets 62 which are each generally shaped like a sideways "U". (Only one of the brackets 62 is visible in the illustrated view.) The lower legs of the brackets 62 include open slots 70 which, when rolled stock material is used with the machine 10, cradle a supply rod extending through the hollow tube of the stock roll. Consequently, the open slots 70 are not necessary if the fan-folded stock material 12 of the present invention is used with the machine 10.

The upper legs of the U-brackets 62 cooperate to mount a ply-separator 74 and a constant-entry bar 80. The ply-separator 74 includes three horizontally spaced relatively thin cylindrical separating rods (shown but not specifically numbered). The number of separating rods, namely three, corresponds to the number of plies of the stock material 12. The ply-separator 74 separates the plies 12*a*, 12*b*, and 12*c* from each other prior to their passing to the forming assembly 52. The constant-entry bar 80 is positioned upstream from the ply-separator 74 and assures that a uniform entrance of the plies 12*a*, 12*b*, and 12*c* into the ply-separator 74.

To load the machine 10, the stock material 12 is appropriately positioned adjacent the stock supply assembly 60. In the illustrated embodiment, this positioning entails setting the box 20 on the supporting surface beneath the stock supply assembly 60. The leading edges of the plies 12*a*, 12*b*, and 12*c* are threaded through the stock supply assembly 60, the forming assembly 52, and the pulling/connecting assembly 54. During operation of the machine 10, the plies 12*a*, 12*b*, and 12*c* are pulled from the box 20, over the constant-entry bar 80, through the ply-separator 74, and into and through the conversion assembly 11. By using the fan-folded stock material 12 of the present invention, as opposed to rolled stock material, edge-tension problems are believed to be minimized and increased operating speeds are believed to be possible. (Details of the problems associated with excessive edge tension are discussed in co-pending and co-owned U.S. Pat. No. 5,211,620, filed on Nov. 1, 1991.)

One may now appreciate that the present invention provides a fan-folded stock material which may be stored and/or transported in a box. Additionally, the fan-folded stock material is compatible with existing cushioning conversion machines which are designed for use with rolled stock material, such as those machines disclosed in U.S. Pat. Nos. 3,509,798; 3,603,216; 3,655,500; 3,779,039; 4,026,198; 4,109,040; 4,717,613; and 4,750,896; co-pending U.S. patent application Ser. Nos. 07/592,572 and 07/712,203; and/or other cushioning conversion machines currently being developed and patented by the assignee of the present invention. Still further, increased operating speeds are possible, and edge-tension problems are minimized, when the fan-folded stock material is used instead of rolled stock material.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A stock material for use with a cushioning conversion machine, said stock material comprising a plurality of superimposed plies of a sheet-like paper material including at least one ply of Kraft paper;

said superimposed plies being fan-folded into a stock;

said superimposed plies including a series of alternative folds which each create superimposed creases through said plies and said series of folds together forming a sequence of rectangular pages which are piled accordion-style one on top of the other to form said stack, said plies within each page each having adjacent surfaces directly contacting one another;

wherein said folds and said pages are free of perforations;

said plies within each page have lateral edges transverse to the folds and wherein said lateral edges are unconnected to each other.

2. A stock material as set forth in claim 1 wherein at least one of said plies is made of thirty-pound Kraft paper.

3. A stock material as set forth in claim 2 wherein all of said plies are made of thirty-pound Kraft paper.

4. A stock material as set forth in claim 1 wherein said plies are made of a material selected from a group consisting of thirty-pound Kraft paper, printed paper, bleached paper, fifty-pound Kraft paper, and combinations thereof.

5. A stock material as set forth in claim 1 wherein said plurality of plies comprises three plies of said sheet-like material.

6. A stock material as set forth in claim 1 wherein said plurality of plies comprises four plies of said sheet-like material.

7. A stock material as set forth in claim 1 wherein each of said rectangular pages has a width greater than the distance between the folds.

8. A stock material as set forth in claim 1 wherein each of said rectangular pages has a width of approximately thirty inches and the distance between said folds is approximately twelve inches whereby the width of said stack is approximately thirty inches and the length of said stack is approximately twelve inches.

9. A stock material as set forth in claim 8 wherein each of said rectangular pages has a width of approximately fifteen inches whereby the width of said stack is approximately fifteen inches.

10. A stock material as set forth in claim 1 wherein said stock material is biodegradable and recyclable.

11. In combination, stock material for use with a cushioning conversion machine and a package containing said stock material;

said stock material including a plurality of superimposed plies of a sheet-like paper material including at least one ply of Kraft paper;

said superimposed plies being fan-folded into a stack;

said superimposed plies including a series of alternating folds which each create superimposed creases through said plies; and said series of folds together forming a sequence of rectangular pages which are piled accordion-style one on top of the other to form said stack, said plies within each page each having adjacent surfaces directly contacting one another;

wherein said folds and said pages are free of perforations;

said plies within each page have lateral edges transverse to the folds and wherein said lateral edges are unconnected to each other.

12. A combination as set forth in claim 11 wherein package comprises a corrugated cardboard box.

13. A combination as set forth in claim 12 wherein said box is rectangular in shape and is sized to closely surround said stack.

14. A combination as set forth in claim 13 wherein said box is approximately thirteen inches wide, approximately thirty-one inches long, and approximately ten inches high.

15. A combination as set forth in claim 11 wherein said stock material is biodegradable and recyclable.

16. A combination as set forth in claim 11 wherein at least two of said plies is made of thirty-pound Kraft paper.

17. A combination material as set forth in claim 16 wherein all of said plies are made of thirty-pound Kraft paper.

* * * * *